March 22, 1927. 1,622,109
J. F. HAWORTH
CABLE OR WIRE CLAMP
Filed Nov. 1, 1926 2 Sheets-Sheet 1
Fig.1.
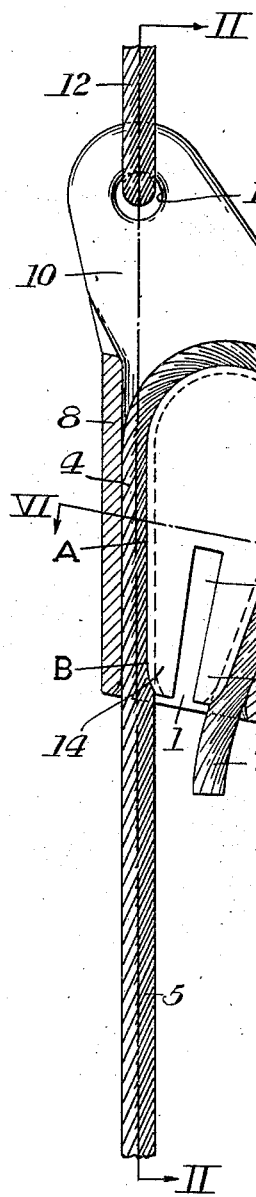
Fig.2.
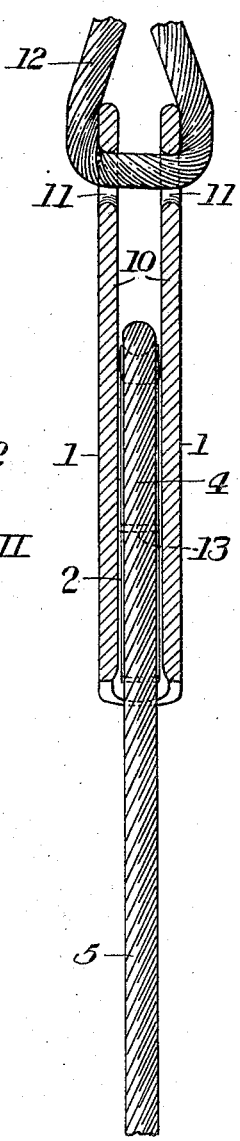
Fig.3.
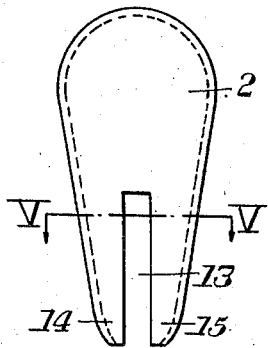
Fig.4.
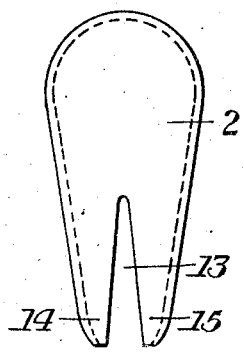
Fig.5.
Fig.6.
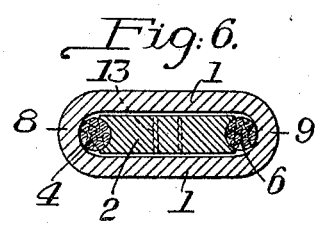
INVENTOR
John Frederic Haworth
by Byrnes, Stebbins & Parmelee,
his attorneys March 22, 1927.
J. F. HAWORTH
1,622,109
CABLE OR WIRE CLAMP
Filed Nov. 1, 1926
2 Sheets-Sheet 2
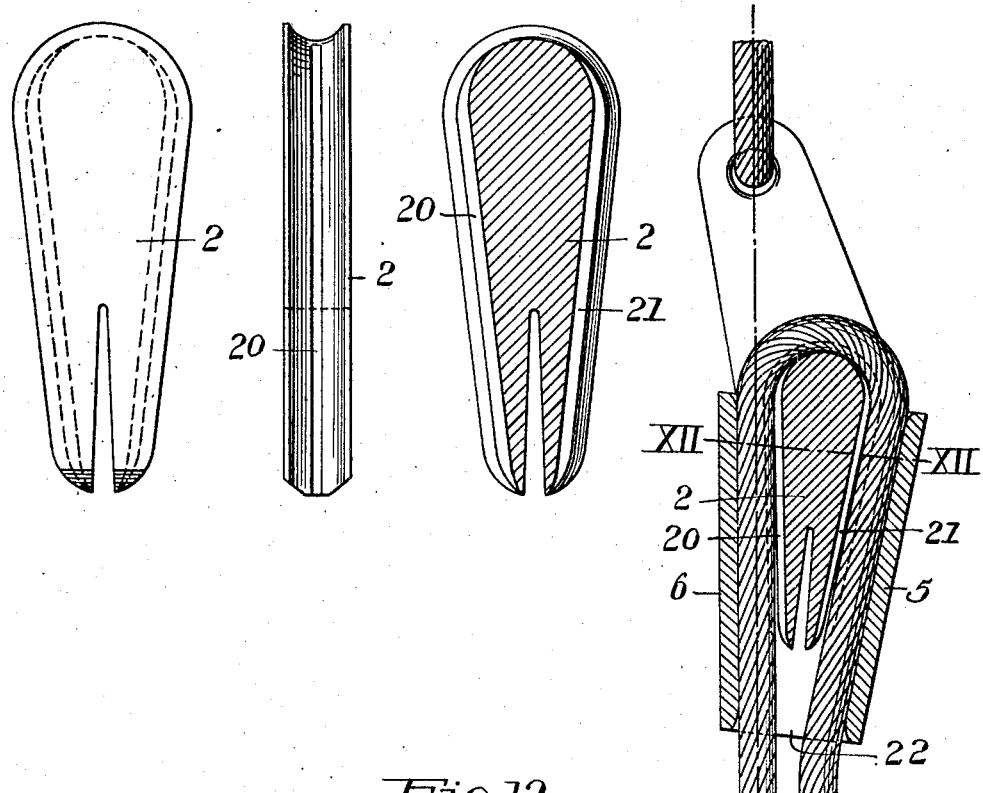
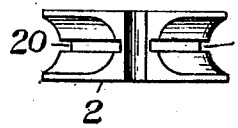
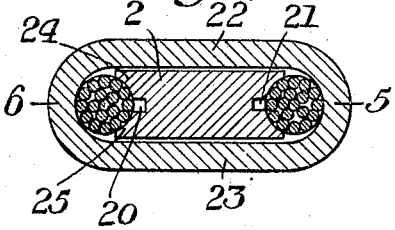
INVENTOR
John Frederic Haworth
by Byrnes, Stebbins & Parmelee,
his attorneys Patented Mar. 22, 1927.

1,622,109

UNITED STATES PATENT OFFICE.

JEHU FREDERIC HAWORTH, OF EDGEWORTH, PENNSYLVANIA.

CABLE OR WIRE CLAMP.

Application filed November 1, 1926. Serial No. 145,672.

The present invention relates to cable or wire clamps, and more especially to a clamp in which the cable or wire is frictionally gripped, usually by means of a wedge inserted in a tapered housing so as to clamp the wire between the wedge and housing in such a manner that the tension on the wire will tend to increase the clamping grip of the wedge.

The invention is shown as embodied in the type of connector in which a loop of the wire or cable is passed around a wedge held in the tapered housing, so that the tension on one leg of the loop will tend to draw the wedge toward the smaller end of the housing, and thus insure an increasing grip on the wire or cable with an increasing tension. An example of this type of connector is shown in my Patent No. 1,380,800, of June 7, 1921, and will be explained with particular reference thereto, it being understood that the invention may be embodied in other specific types of clamps within the scope of the claims, as for example, in clamps in which a plurality of wedges are employed or in which the grip is put on the cable by driving in the wedge or in which a single length of cable is gripped, as distinguished from a loop.

As shown in my prior patent, the cable passes around a wedge in the form of a loop, one leg of the loop being a continuation of the cable to be held or tensioned, and the other leg of the loop being the free or untensioned end of the cable. Also, as described in my prior patent, the tensioned leg or loop is held between surfaces which diverge slightly toward the end of the connector where the tensioned cable enters; that is to say, the walls of the wedge and the housing which engage the tensioned leg of the loop diverge slightly toward the tensioned part of the cable. As further explained in my prior patent, the tensioned leg of the cable thus forms a portion of the cable against which the wedge exerts a substantially continuous clamping grip, the pressure of the grip being progressively less toward the point of the wedge or toward the part of the loop which is subjected to the greatest tension.

As will be readily apparent from a consideration of a short length of cable held between frictional gripping surfaces, the cable where it enters between the surfaces will be subjected to the full tension applied to the free cable, and the tension or tensile pull on the cable will gradually decrease along the portions of the cable further in between the clamping surfaces. The clamping pressure applied laterally to the cable tends to distort the cable or wire and to thus make it weaker than the free cable, which is not subjected to such clamping action. Since the cable at and near the point where it enters the clamp is subjected to the greatest tensile strain, the cable at this point should be subjected to less clamping pressure than further in the clamp where the tensile pull on the cable is less. To obtain the best results in a cable clamp of this type, the gripping pressure on the clamped portion of the cable should be applied gradually and progressively from the point where the tensioned cable enters the clamp toward the opposite end of the clamped portion. In my prior patent, this was approximated by making the surfaces between which the cable was clamped slightly divergent toward the tensioned part of the cable, so that, as the wedge was forced into place, the hardest grip would be near the head or wider part of the wedge and the grip would decrease toward the point of the wedge, thus applying the greatest pressure on the cable at points where the tension was somewhat relieved, and not applying too great a pressure where the tension on the cable approached the full pull on the free cable. In my prior patent, the wedge was made solid and reliance was placed upon carefully proportioning or machining the parts to obtain the theoretically desired divergence. However, I have found that when the cables are pulled to nearly their ultimate strength, tremendous pressures are developed between the wedge and the housing which tend to expand the housing. It is practically impossible to predict in just what way the housing will expand, so that while the cable connector shown in my prior patent approximated the desired theoretical optimum condition, it did not always reach it as closely as might be desired, and moreover, required very careful proportioning and machining of the parts.

I have found that the theoretically desired conditions may be much more closely approached under all conditions by making the members between which the cable is clamped progressively more yieldable along the portion of the clamped cable where the tension is greatest. This is preferably done by structurally weakening the clamping members, preferably the points of the wedge, so that when the cable is put under tension and the wedge is drawn in thereby, or when the wedge is hammered in, the gripping surface at the end of the wedge can yield somewhat and relieve what would otherwise be too great a pressure between the tip of the wedge and the housing. This is preferably done by forming a slot across the end of the wedge, leaving the lower end of the wedge forked or bifurcated, the forked ends being capable of yielding toward each other as the wedge is forced into place.

For simplicity, the invention will be described with particular reference to a cable clamp of the usual type, in which the end of the cable embraces a single wedge held in a tapered housing. While a cable of the wire rope type, which is made up of a plurality of separate wires, is illustrated as being held in the clamp, it will be obvious that a cable composed of a single wire or a cable of material other than metal might be held.

In the drawings:

Figure 1 is a longitudinal section through a cable clamp embodying my invention, showing a cable clamped therein;

Figure 2 is a longitudinal section along the line II—II of Figure 1;

Figure 3 is an elevation of the wedge shown in Figure 1;

Figure 4 is an elevation of a modified form of wedge;

Figure 5 is a section along the line V—V of Figure 3;

Figure 6 is a section along the line VI—VI of Figure 1;

Figure 7 is a longitudinal section through a cable clamp illustrating a modification;

Figure 8 is an elevation of the wedge shown in Figure 7;

Figure 9 is a side elevation of such wedge;

Figure 10 is a section through such wedge;

Figure 11 is a bottom plan view of such wedge; and

Figure 12 is a section along the line XII—XII of Figure 7.

Referring to the illustrated embodiment of the invention:

The cable clamp comprises a housing indicated generally by reference numeral 1. The housing has a tapered socket in which the wedge 2 is inserted. The cable 3 is passed around the wedge, as shown, in the form of a loop, the leg 4 of which is a continuation of the tensioned part 5 of the cable, while the leg 6 is under relatively little tension since it is the part of the loop toward the free end 7 of the cable. The tapering socket is formed between the converging side walls 8 and 9. The side walls 8 and 9 are preferably longitudinally straight and are channeled or curved to conform to the cylindrical surface of the cable.

As will be readily apparent, a pull on the tensioned part of the cable 5 will tend to draw the wedge 2 toward the smaller end of the tapered socket and will increase the grip on the cable between the wedge and the sides of the socket. The upper part of the housing has two ears 10 which have holes 11, through which some attaching device, such as another cable 12 or a hook, may be passed. The holes 11 are directly opposite the center line of the tensioned part 5 of the cable, so that the pull exerted is in direct line of the cable, and the cable is not subjected to any weakening kinks or bends where it emerges from the clamp.

The wedge 2 instead of being solid as shown in my prior patent has a transverse slot 13, formed in its smaller end or tip, so that the lower end of the wedge is formed by two prongs 14 and 15, which are yieldable toward each other under sufficient pressure. When the slot 13 is milled into the wedge 2, it is preferably formed with parallel sides, as shown in Figure 3. However, if the wedge is cast, or if desired, in milling, the slot 13 may be tapered, as shown in Figure 4. The prongs 14 and 15 of the form of wedge shown in Figure 4 are structurally somewhat stronger than in the form of wedge shown in Figure 3 and require more pressure to make them yield toward each other.

The edges of the wedge are channeled or inwardly curved, as indicated by reference numeral 16, to conform to the cylindrical outline of the cable.

When the wedge 2 is forced into its tapered socket either by the heavy tension on the cable or by driving it in, the cable which is gripped between the wedge and the walls of the socket will be somewhat compressed. When this occurs, the upper or solid part of the wedge above the slot 13 will exert a maximum and unrelieved pressure against the portion of the loop leg 4, opposite this part of the wedge; or as shown in the drawings, against the upper part of the loop leg 4. The pressure exerted by the lower or forked end of the wedge against the leg 4 of the cable loop will be somewhat relieved by the yielding of the prongs 14 and 15 toward each other. Each prong will behave somewhat in the nature of a beam fixed at one end, so that the lower end of the prong will yield the most and the pressure exerted by, say, the prong 14, against the leg 4 will gradually decrease from a maximum at a point indicated by reference letter A, opposite the end of the slot, to a point indicated by reference letter B, opposite the free end of the prong. Since the yielding of the prong 14 will be determined by the lateral pressure exerted against it by its contact with the cable, and since the pressure which the prong is capable of sustaining will decrease progressively toward the free or distal end of the prong the cable between the points A and B will be subjected to a decreasing clamping pressure from A to B. By properly proportioning the prongs, the clamping pressure exerted against the cable at the point B where it enters the clamp and where it is subjected to full tension may be made as light as desired, so that the cable at the point of full tension will not be subjected to a damaging or distorting lateral pressure. As shown in the drawings, the prongs are tapered toward their distal ends, thus tending to produce the desired distribution of clamping pressure along the cable-gripping surface of the prong.

Since the cable is being frictionally gripped from the point B along the leg 4, the tension to which the cable is subjected will be less along the cable from the point B toward the point A and beyond. The tension will be sufficiently decreased at the point A, so that beyond it, there is no particular objection to applying the full and unrelieved clamping pressure of the wedge. It will therefore be seen that by structurally weakening the smaller end of the wedge, the grip along the cable from the point B into the clamping device will automatically adjust itself, beginning with a relatively light clamping pressure at the point B and continually increasing toward the point A and beyond. This automatic adjustment of the progressive increase in pressure will take place without careful machining of the parts to the theoretical divergence between the edge of the wedge and the side of the socket, and will also automatically adjust itself for such stretching of the metal of the socket as may occur under heavy pressures.

The proportioning of the pressures along the untensioned leg 6 of the cable is not particularly important, since this part of the cable is subjected to but little tensile pull. The important region to be considered is the clamping surfaces which grip the tensioned leg 4 of the loop, and particularly along the part of the tensioned leg 4 where the cable enters the clamp and where it is subjected to the greatest tension. The edges of the wedge 2, as the wedge is cast or machined, may be made straight and parallel with the walls 8 and 9 of the socket. When the wedge is forced into place, the prongs 14 and 15 will yield, so that there will be attained the desired divergence between the gripping edge of the wedge and the side 8 of the socket, along the leg of the cable between the points A and B. It is preferred, however, instead of making the edges of the wedge exactly parallel with the sides 8 and 9 of the socket, to make the wedge slightly more tapering than the socket, so that as initially inserted, there will be a divergence in a direction toward the point of the wedge of about one-half of a degree between each edge of the wedge and the registering walls 8 and 9 of the socket. This will give an initially gradually increasing grip on the cable from the point of the wedge to its wider end. This will result in a gradual increase in the grip of the wedge on the cable even along the solid upper part of the wedge from the point A upwardly, as shown in the drawing. It is found, however, that when the wedge is forced into place, the divergence between the gripping edge of the wedge and the side of the socket will be increased from the point A to the point B, the prongs bending inwardly to form a slight convex curvature against the cable. When a heavy tension is put upon the cable, there is a noticeable closing at the end of the slot 13.

In the modification of the invention illustrated in Figures 7 to 12, there is provided a further self-compensating adjustment of the grip exerted against the cable. Small longitudinal slots 20 and 21 are cut in the bottom of the channeled edges 16 of the wedge 2. As shown in the drawings, there is a loose fit or slight clearance between the flat sides of the wedge 2 and the registering webs or side walls 22 and 23 of the wedge socket, so that the slots 20 and 21 will allow a very slight spreading movement between the portions 24 and 25 of the channels 16, so that if there is any slight inequality in the size of the cable or in the walls 8 and 9 of the socket, or in the channeled edges of the wedge, such inequality can be relieved and any tendency toward localized points of excessive pressure will be minimized.

While it is preferred to structurally weaken the smaller edge of the wedge by transversely slotting it in order to get the progressive yield to progressively decrease the grip on the cable along the portions where the tension is at a maximum, this yield might otherwise be provided for, as for example, by otherwise structurally weakening the tip of the wedge or structurally weakening the smaller end of the tapered housing.

As above described, the provision of the relative yield between clamping surfaces progressively along the clamped portion of the cable toward its tensioned end insures, under all conditions, and without theoretically perfect machining, the desired frictional grip on the cable, so that the rupturing tension on the cable in the region where it enters the clamp may be maintained nearly equal to the rupturing tension of the free cable. In fact, tests have shown that in a large proportion of the cases where cables have been pulled to the breaking point, the break occurs outside of my clamp, showing the close approximation to the ideal clamping condition. It is notorious that most cable clamps cause the cable to break at the point where the cable enters the clamp, thus requiring cables of larger size than are required for the strains to which the free part of the cable is subjected. By the use of my improved cable clamp, smaller cables may be employed for the same work, and thus a considerable saving in the cost of the cables may be attained.

While I have specifically illustrated and described the preferred embodiment of my invention, it is to be understood that the invention is not limited to its illustrated embodiment, but may be otherwise embodied within the scope of the following claims.

I claim:

1. A clamp for cables or wires, comprising a housing having a tapered socket for receiving a loop of the cable or wire, and a wedge in the socket tapered in the same direction as the socket and within the loop of the cable or wire for frictionally clamping the loop, the cooperating portions of the housing and wedge which grip the tensioned leg of the loop being more yieldable relatively to each other at the small end of the socket, whereby the clamping grip on the tensioned leg of the loop is less on the tensioned end of the gripped leg of the loop than at its other end.

2. A clamp for cables or wires, comprising a housing having a tapered socket and a cable or wire-clamping wedge in the socket arranged to be drawn toward the smaller end of the socket by a tension on the cable or wire, the cable or wire-engaging portions of the housing and wedge at the smaller end of the socket being more yieldable relatively to each other than at the other end of the socket, whereby the clamping pressure on the gripped portion of the tensioned cable or wire is relieved at the smaller end of the socket.

3. A clamp for cables or wires, comprising a cooperating cable or wire-gripping members for exerting a clamping grip along a portion of a cable or wire and arranged to be drawn together to increase their grip on the cable or wire as the cable or wire is tensioned, said members having their ends toward the tensioned portion of the cable or wire made relatively yieldable so as to exert less grip on the cable or wire at the tensioned end of the gripped portion of the cable or wire than at the less tensioned parts of such gripped portion of the cable or wire.

4. A clamp for cables or wires comprising cable or wire-gripping members for clamping a portion of the cable or wire having prongs arranged to exert a yieldable grip on the cable or wire which progressively decreases toward the tensioned end of the clamped portion.

5. A clamp for cables or wires, comprising a cable or wire-gripping member having prongs for exerting a substantially continuous clamping grip along a portion of the cable or wire to be put under tension and arranged to increase the clamping grip as the cable or wire is tensioned, the clamping members being so yieldable that the grip on the clamped portion of the cable or wire is less at the tensioned end thereof than at the less tensioned parts.

6. A clamp for cables or wires, comprising a housing having a tapered socket and a clamping wedge in the socket having integral yielding prongs at its smaller end for exerting a grip on the cable decreasing progressively along the prongs toward their distal ends.

7. A cable or wire clamp, comprising a housing having a tapered socket for receiving a loop of the cable or wire, a wedge in the socket tapered in the same direction as the socket and within the loop of the cable or wire, having the portion of its surface which engages the tensioned loop of the cable or wire where it enters the clamp yieldable away from the cooperating gripping surface of the socket so as to exert less pressure upon the cable or wire where it enters the socket than farther along on the tensioned leg of the loop.

8. A clamp for cables or wires, comprising a housing having a tapered socket for receiving a loop of the cable or wire, a wedge in the socket tapered in the same direction as the socket and within the loop of the cable or wire, said wedge having a transverse slot through its smaller end to form cable or wire-engaging prongs yieldingly cooperating with the registering walls of the socket for gripping the cable or wire with a pressure which decreases toward their distal ends.

9. A clamp for cables or wires, comprising a housing having a tapered socket, a wedge in the socket tapered in the same direction as the socket and having a prong extending from its smaller end and having one side in gripping engagement with the cable or wire where it enters the socket, but being unsupported at its opposite side, so as to be yieldable and exert a yielding grip on the cable or wire decreasing toward its distal end.

10. A cable or wire clamp, comprising a housing having a tapered socket for receiving a loop of the cable or wire, a wedge in the socket tapered in the same direction as the socket and within the loop of the cable or wire for frictionally clamping the tensioned leg of the loop against one side of the socket, the wedge having at its smaller end a prong adapted to exert a clamping pressure against the tensioned leg of the loop toward the registering surface of the clamp, the other side of the prong being out of contact and unsupported by the opposite side of the housing so as to yield under lateral pressure exerted by its engagement with the cable or wire.

11. A cable or wire clamp comprising a housing having a tapered socket and a wire or cable-clamping wedge in the socket tapered in the same direction as the socket having its smaller end forked and having a slot in its cable-engaging surface.

12. A cable or wire clamp comprising a housing having a tapered socket, a cable or wire-clamping wedge in the socket having a channeled edge arranged to engage the cable or wire, and having a slot along the bottom of the channel to permit the sides of the channel to yield slightly under pressure.

14. A cable or wire clamp comprising a housing having a tapered socket for receiving a loop of the cable or wire, and a wedge in the socket tapered in the same direction as the socket and within the loop of the cable or wire for frictionally clamping the tensioned leg of the loop against one side of the socket, the edge of the wedge engaging such loop being channeled to conform to the outline of the cable or wire and having a slot along the bottom of the channel to permit the sides of the channel to yield slightly.

14. A cable or wire clamp, comprising a housing having a tapered socket for receiving a loop of the cable or wire, and a wedge in the socket within the loop of the cable or wire having its sides loosely fitting within the socket and having its edge which engages the tensioned leg of the loop channeled to conform to the outline of the cable or wire with a slot along the bottom of the channel to permit the sides of the channel to yield slightly to compensate for irregularities of the gripping pressure on the cable or wire.

In testimony whereof I have hereunto set my hand.

JEHU FREDERIC HAWORTH.